United States Patent [19]

Tusting

[11] Patent Number: 4,707,094
[45] Date of Patent: Nov. 17, 1987

[54] APPARATUS AND METHOD OF SUBMARINE OPTICAL RECORDING

[75] Inventor: Robert F. Tusting, Ft. Pierce, Fla.

[73] Assignee: Harbor Branch Oceanographic Institution Inc., Ft. Pierce, Fla.

[21] Appl. No.: 842,139

[22] Filed: Mar. 21, 1986

[51] Int. Cl.⁴ .......................................... G03B 17/08
[52] U.S. Cl. ..................... 354/64; 354/403; 354/76
[58] Field of Search ................. 354/64, 266, 402, 403, 354/75, 76, 131, 424, 410, 165

[56] References Cited

U.S. PATENT DOCUMENTS

| | | | |
|---|---|---|---|
| 1,917,245 | 7/1933 | Edwards et al. | 354/131 |
| 2,315,978 | 4/1943 | Moorefield | 354/410 |
| 3,738,248 | 6/1973 | Fish et al. | 354/64 |
| 4,032,934 | 6/1977 | Hendrickson et al. | 354/165 |
| 4,335,944 | 6/1982 | Marshall | 354/64 |
| 4,381,144 | 4/1983 | Breslau | 354/64 |
| 4,447,896 | 5/1984 | Rines | 354/64 |
| 4,470,680 | 9/1984 | Inagaki | 354/402 |
| 4,618,235 | 10/1986 | Ishida et al. | 354/403 |

Primary Examiner—Russell E. Adams
Attorney, Agent, or Firm—Carroll F. Palmer

[57] ABSTRACT

Submarine photography apparatus includes a camera to record scenes in a selected sector forward thereof; a source of light having a wavelength in the range between about 650 and 700 nm. designed to project from a position lateral of the camera a conical light beam so that it intersects the sector; and a system of optical and electronic elements to detect and measure the intensity of reflected light from a photographic subject within a conical volume that has its apex lateral of the camera and extends toward the sector to intersect the light beam so that the intersecting peripheries of the light beam and the conical volume substantially define the sector. Methods of photographing with the apparatus include flashing a strobe light and exposing the camera when the system measures an intensity of the reflected light above a predetermined minimum value within the sector.

12 Claims, 3 Drawing Figures

APPARATUS AND METHOD OF SUBMARINE OPTICAL RECORDING

BACKGROUND OF THE INVENTION

1. Field of the Invention

This invention relates broadly to apparatus and methods for submarine photography. More particularly, it concerns improvements in such apparatus and methods that inform the system when a photographic subject is in the camera's field of view and that the distance to the subject is suitable for in-focus photography.

2. Description of the Prior Art

A great number of underwater photographs are taken with cameras which have limited remote controls. This is particularly true of deep-sea 35 mm. camera systems where camera lens opening and focus are preset and the photographer must somehow arrange for the subject to be at the correct distance and within the field of view at the time of exposure.

One approach to providing better control in submarine photography would be to incorporate the ranging features of advanced, above the surface (surface) cameras. Such cameras use a variety of techniques to obtain proper exposure conditions for control. The most common is a triangulation arrangement which superimposes the images received by a pair of space optical receivers and provides automatic, mechanical adjustment of the lens until the received images are coincident. Microelectronics are used to perform the image comparison and thereby provide automatic focusing (see U.S. Pat. Nos. 3,435,744 and 4,313,654).

Other advanced surface cameras use microprocessor based optical-image analyzers to determine correct focus. Also, sonar systems are used in some cameras.

The optical systems of the surface cameras generally use infrared light beams with reflected light intensity, image analysis and triangulation. Unfortunately, the devices and techniques developed for surface cameras are not directly transferable to submarine camera systems. Differences between the physical properties of air and water result in major differences in the propagation of light and sound in the two media. Additionally, spurious material and signals can cause many "false" exposures to occur with submarine photography while this is not a serious consideration in use of surface cameras. Therefore, a camera system which depends on the propagation of energy waves for operation must be designed for the medium in which it is to be used.

Extensive development work has occurred relative to submarine photography, e.g., see "Underwater Photography—Scientific and Engineering Applications", compiled by Paul Ferris Smith, Van Nostrand Reinhold Company, 422 p., 1984. Such work has included use of (a) optical triggering of underwater cameras, e.g., see U.S. Pat. No. 3,446,555 and pp. 223-228, "Deep Sea Photography", J. B. Hersey, Editor, The Johns Hopkins Press, 1967, and (b) sonar techniques, e.g., see U.S. Pat. Nos. 4,105,990; 4,335,944; 4,381,144 and 4,447,896.

Notwithstanding the extensive prior work and developments with surface and submarine camera systems, substantial improvements are needed for the submarine systems, e.g., to provide for (1) more efficient use of battery or other power, (2) saving of film and (3) mitigation of triggering of exposure by spurious materials or events.

OBJECTS

A principal object of the invention is the provision of improved apparatus and methods for submarine photography.

Further objects include the provision of:

1. Improvements in such apparatus and methods that inform the system when a photographic subject is in the camera's field of view and that the distance to the subject is suitable for in-focus photography.
2. Improved control over the submarine volume to be photographed by selection of source/detector geometry and illumination/detection volumes.
3. Improved subject detectability and rejection of spurious signals (noise and background light) in submarine photography systems.
4. Relatively simple, radiant energy triangulation systems which accommodate existing 35 mm. or equivalent cameras.
5. Such camera systems that can automatically determine if there is a candidate subject in the camera's field of view and verify that the camera to subject range is within the exposure depth of field.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of new submarine photography apparatus can automatically determine if there is a candidate subject in the camera's field of view and verify that the camera to subject range is within the exposure depth of field (FOVAR apparatus).

Broadly described, the improved apparatus for submarine optical recording comprises (a) a camera to record scenes in a predetermined sector forward thereof, (b) a source of modulated light having a wavelength in the range between about 650 and 700 nm. provided with first optical means to project a divergent conical light beam from the source, (c) means locating the first optical means spaced apart radially from the camera to project the light beam so that it intersects the predetermined sector, (d) receiver means to detect and measure the intensity of light in the wavelength range provided with second optical means to view a conical volume, (e) means locating the second optical means spaced apart radially from the camera so the conical volume intersects the light beam and the intersecting peripheries of the light beam and the conical volume substantially define the predetermined sector, and (f) signal means that is activated by the receiver means when it measures an intensity of light in the wavelength range above a predetermined minimum value.

The objects of the invention are further accomplished by new methods for submarine optical recording which broadly comprise the steps in combination of (A) positioning a camera to record scenes in a predetermined sector forward thereof, (B) projecting a divergent conical beam of light having a wavelength in the range between about 650 and 700 nm. from a source spaced apart radially of the camera so that the beam intersects the predetermined sector, (C) detecting light of the wavelength existing in a divergent conical volume the apex of which is spaced apart radially from the camera so that the conical volume intersects the light beam and the intersecting peripheries of the light beam and the conical volume substantially define the predetermined sector, (D) analyzing the detected light to determine when it reaches an intensity above a predetermined value, and (E) causing the camera to record when the detected light reaches the intensity.

The objects are further accomplished by additional features and specific embodiments that are described in more detail in the following text.

BRIEF DESCRIPTION OF THE DRAWINGS

A more complete understanding of the invention may be had by reference to the accompanying drawings in which.

DESCRIPTION OF THE PREFERRED EMBODIMENTS

Figure 1:
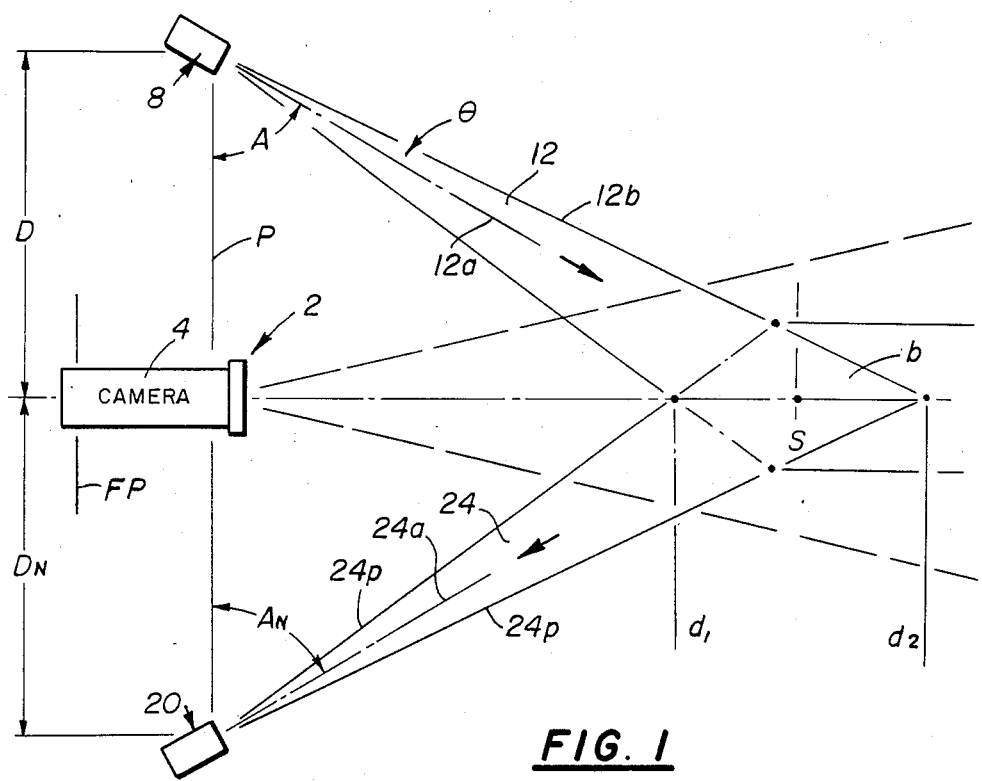
FIG. 1 is a diagrammatic representation of an improved submarine optical recording system of the invention.
Figure 2:
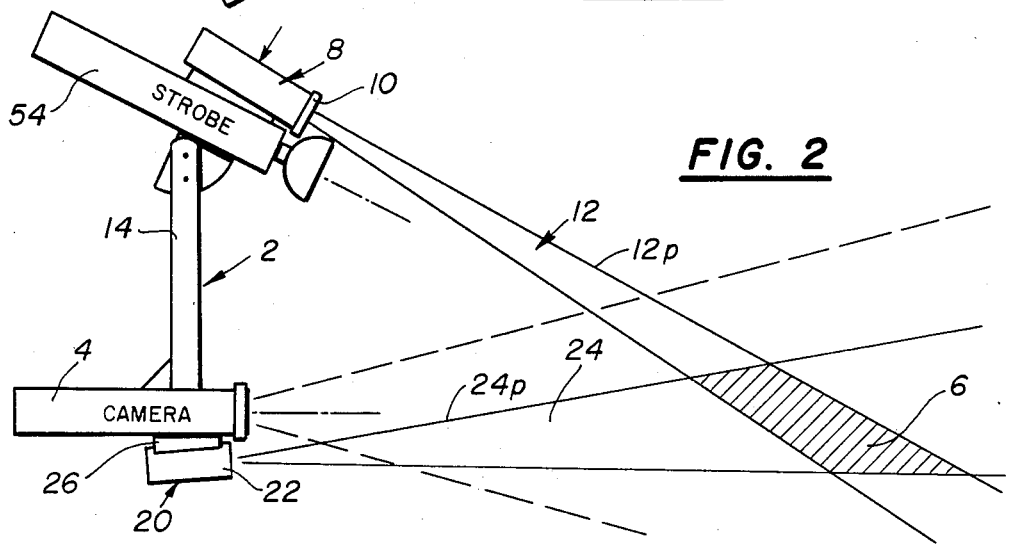
FIG. 2 is a lateral view of one embodiment of an improved submarine optical recording system of the invention.

Referring in detail to the drawings, in which identical parts are identically marked, the invention comprises improved apparatus 2 for submarine optical recording having a camera 4 to record scenes in a predetermined sector 6 forward thereof, defined by a minimum distance $d_1$ and a maximum distance $d_2$ from and perpendicular to the focal plane FP of the camera 4.

There is a source 8 of modulated light having a wavelength in the range between about 650 and 700 nm. associated with optical means 10 to project a divergent conical light beam 12 having a divergency of $2\theta$, where $\theta$ is the maximum angle between the central axis 12a and periphery 12b of the beam 12 from the source 8.

Means 14 locates the optical means 10 spaced apart radially a distance D from the camera 4 to project the light beam 12 at an angle A relative to a plane P parallel to the focal plane of the camera 4 so that the beam 12 intersects the sector 6.

Receiver means 20 to detect and measure the intensity of light in the stated wavelength range is provided with optical means 22 to view a conical volume 24.

Means 26 locates optical unit 22 spaced apart radially from the camera 4 so the central axis 24a of the conical volume 24 intersects the central axis 12a of light beam 12 at point S in the sector 6. The intersecting peripheries 12p of the light beam and the intersecting peripheries 24p of the conical volume substantially define the boundaries of sector 6.

Typically, the optical unit 22 will comprise a filter 28 and at least one lens 30 and the receiver means will comprise a photo-detector 32 and amplifier 34.

In preferred embodiments, the means 20 is structured to have the light source 2 project pulse modulated light and for the means 20 to operate as a synchronous receiver. Typical equipment so designed will comprise an integrated circuit synchronous detector 36, master timer means 38, rate control means 40, external control means 42, integrated circuit output means 44 and signal means 46. Further, a preferred light source 8 comprises a light emitting diode 48, a least one projection lens 50 and driver means 52 powered by the timer means 38.

The signal means 46 is activated when the receiver means 20 comprises an intensity of light of the prescribed wavelength range in synchronization with the light source within the conical volume 24 above a predetermined minimum value. The signal means 46 may serve to have a operator manually make an exposure with the camera 4 via a remote control (not shown) or, preferably, the means 46 is coupled to the camera, e.g., via a solenoid, to automatically make the exposure. Additionally, the apparatus 2 includes a strobe unit 54 to project high intensity light into the sector 6 coincidental with the camera exposure. The operation of strobe unit 54 will be controlled by the signal means 46 similar to the camera exposure.

In use of the apparatus 2, it will perform two functions, namely, (1) determine if there is a candidate subject in the sector 6 and (2) verify that the camera to subject distance is within the camera's depth of field. If both of these conditions are not met, there is no point in taking a photography with the camera 4.

The new systems 2 are comtemplated to be used primarily in two situations. The first involves photographing objects from a submersible (manned or unmanned) where the operator has a moderate amount of control over the aiming of the camera, but does not know precisely where it is pointed or if the range is correct for the subject to be satisfactorily recorded. This is often the case in manned submersibles equipped with transparent ports or the like which, typically, permit a forward view that, however, is distorted to an extent that prevents accurate specimen distance or direction determination.

The second application involves unattended, e.g., mid-water mooring, camera systems that photograph "targets of opportunity", i.e., take a photograph whenever something enters the photographic field. In such cases, the focus length and lens aperture are preset for the size of objects of interest and the new systems 2 will patiently wait for the something interesting to happen along. Such operation can be compared to the prevailing "shot-gun" approach in which periodic exposures are made hoping that a suitable object will be within range at the time.

The light source 8 advantageously operates with light in the range between visible and infra-red, e.g., in the range 650–700 nanometers. Infra-red is typically used in auto-focusing systems of surface cameras, but water strongly absorbs IR light, i.e., at 700 nm. the attenuation coefficient, a is approximately 0.6/m. Hence, over a range r of 3meters, the light intensity is reduced to 17% of its initial intensity ($e^{-ar} = 0.17$).

A simplified explanation of the new FOVAR systems of the invention can be made with reference to FIG. 1.

The amplitude-modulated light source 8 is placed a distance D and the receiver means 20 a distance Dr laterally of the camera 4 with the central axis 12a of the light beam 12 at an angle A and the central axis 24a of the conical volume 24 at an angle Ar to plane P. The divergence of beam 12 is $2\theta$, where $\theta$ is the ange between the central axis 12a and the maximum distance to the periphery 12p of the beam 12. The divergence of the conical volume 24 can be similarly defined by reference to 24a and 24p.

The divergencies of the beam 12 and volume 24 may be varied for various purposes and effects and they may be the same or different and circular or eliptical. In this manner, in conjunction with the angles A and Ar, the size and shape of the sector 6 may be controlled.

In further explanation, assume the apparatus 2 has the basic arrangement in which the distances D and Dr, as well as the angles A and Ar and beam 12 and volume 24 divergencies are equal and selected so the geometry renders the sector 6 to have distances $d_1$ and $d_2$ within the depth of focus of the lens setting of the camera 4. Also, the sector 6 is within the field of view of the camera 4, which together with the strobe 54 are capable of taking a picture once every n seconds for a total number of pictures N.

From the geometry of such an arrangement (FIG. 1), the distance R from plane P to point S is given by:

$$R = D \tan A.$$

The minimum distance P to $d_1$ is:

$$R_{min} = D \tan (A - \theta)$$

and the maximum distance to $d_2$ is:

$$R_{max} = D \tan (A + \theta).$$

Hence, the field of view of the FOVAR system is:

$$2D[\tan (A+\theta) - \tan (A-\theta)]/[\tan (A+\theta) + \tan (A-\theta)].$$

Therefore, the range and field of view are directly determined by the three parameters, D, A and $\theta$, all of which can be selected to be consistent with the depth of field and field of view of the camera 4.

The system will operate so the source 8 periodically, e.g., once a second, projects a sequence of light pulses of the desired wavelength which will illuminate the sector 6, typically for a duration of x milliseconds. The receiver means 20 will simultaneously view the sector 6 and decide if there is an object to be recorded by measuring the amount of detected light within the volume 24. The decision threshold of the detector 32 can be made quite sensitive so that small or nearly transparent objects will be detected and photographed.

In order to obtain good sensitivity and discrimination against stray light, either natural or artificial, the means 20 will use a synchronous receiver.

A wide range of geometrics, i.e., values of A, $\theta$, D, etc., can be used to accommodate the apparatus 2 to the type and size of subjects to be photographed. For example, one configuration can be optimized for small objects at short range, i.e., macro-photography. For an unattended system, a low power version will be structured which can wait for relatively rare events while conserving film and strobe energy. In such situation, every n seconds the FOVAR unit will inspect the sector 6 and decide is it is worth making an exposure. If the answer is no, the system will wait another n seconds to try again. Obviously, many minutes of such operation will pass before a suitable object is present in the sector 6. During such delay, the only energy consumed by the entire apparatus 2 is that used to power the FOVAR unit.

Maximum useful values for $d_1$ and $d_2$ will be mainly controlled by background and receiver means circuitry noise. With this limitation, the improvements of the invention can be used with a wide variety of camera and lens systems.

The new FOVAR devices differ in a number of ways from the prior art triggering systems. Thus, the FOVAR systems can be set up to be automatic so no operator is needed in attendance. Also, the FOVAR systems are useful for photographing mid-water or free-swimming objects. Additionally, the new systems are inherently low in energy consumption making them practical for long term, deployed submarine mooring operations.

The limited power required to operate the FOVAR systems can be supplied from small batteries. Preferably the source 8 will use a high-efficiency, light emitting diode which has a built in lens so that its output is focused into a narrow beam, e.g., an LED with output power of about 20 mW so the peak power required to operate it is about 200 mW. Such LEDs are selected to emit in the state wavelength range. Bioluminescent interference, primarly observed from 455–495 nm, is, thus, minimized since few submarine organisms emit light at wavelengths above 600 nm. Likewise, skylight (both sunlight and moonlight) is increasingly attenuated at wavelengths greater than 600 nm. Operation at wavelengths above 700 nm is undesirable due to the rapid increase of water absorption coefficient, making triggering unreliable except at short range.

Although the detectors, e.g., 32, for the systems can be designed to receive attenuated and reflected light from a subject, scattered light from suspended particles becomes more difficult to reject and can more easily cause false triggering. Hence, the acceptance angle of the receiver is angularly limited to reject as much scattered light as possible. The preferred LEDs will emit primarily in the range of 640–680 nm. This is sufficiently narrow to allow rejection of ambient light, especially using optical filters, e.g., 28, in the receiver means 20.

During typical operation, the FOVAR system is pulse modulated at 50% duty cycle for a precise number of flashes (comprising a burst) as determined by the master timer 38. An illumination angle of about 8°, in water, can be achieved after refraction of the beam through a fused quartz window.

Figure 3:
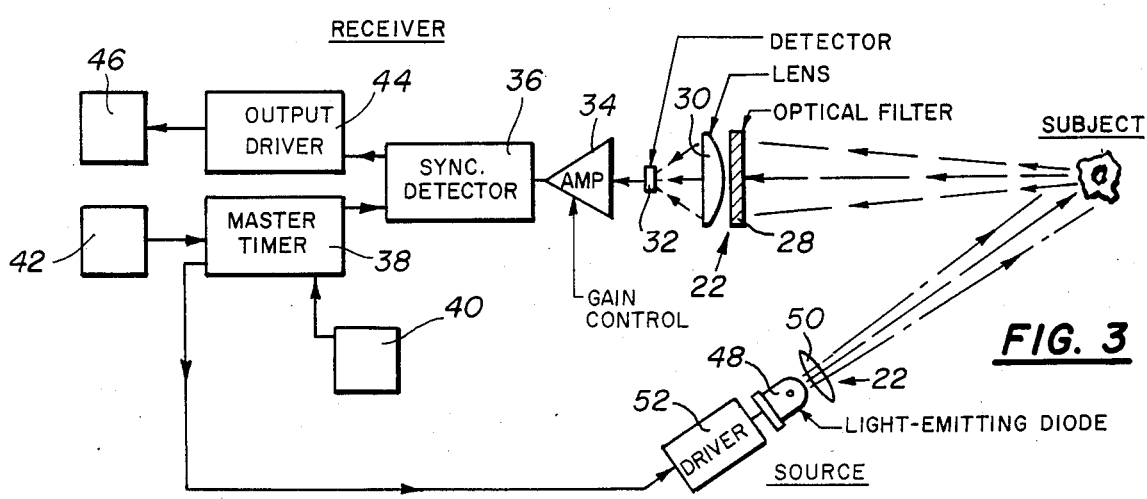
FIG. 3 is a schematic diagram of the system of FIG. 2.

When a photographic subject is present in the sector 6, a small amount of the projected light will be reflected and returned to means 20 and will be related to the size and reflectance of the subject (FIG. 3). The returned light is focused onto a PIN silicon detector 32 by lens 30 after passing through ambient light rejecting filter 28. A low-noise, high-gain amplifier 34 and synchronous detector 36 processes the received signal. Much of the system noise from various sources, e.g., ambient light, thermal noise, etc., are suppressed by synchronous detection, resulting in reliable operation of the system 2.

Operation of the synchronous detector may be explained as follows.

When the light source 8 is off, operation of the synchronous detector is gated off. During the first pulse of light from source 8, the synchronous detector is gated on and the output of the detector 32 and amplifier 34 is integrated. This voltage is signal plus noise. During the time interval immediately following the first light pulse (this off-time is equal to the on-time for square wave pulsing), the synchronous detector is again gated on and the output of the detector/amplifier 32/34 is integrated. This voltage is noise and is subtracted from the previous output. The detector output at the end of the first off-period is a direct measure of the reflected light from the subject.

The integration of signal plus noise (S+N), followed by the integration and subtraction of noise (N) is carried out n times, where n is the number of pulses, a selectable number between 10 and 80. At the end of the nth cycle of the source burst, the detector output is compared with a preset threshold level and a decision is made as to whether a "valid target" is present or not. If the answer is yes, an isolated switch closure (via an opto-coupler) is made and the strobe is fired and the camera shutter is timely operated.

If the answer is no, the FOVAR system waits a preset recycle time and tries again.

The synchronous detector cannot differentiate between scattered light reaching the detector 32 and light from the subject. Therefore, the source 8 and means 20 optics 10 and 22 must be properly designed for good collimation. The advantage of a synchronous detector is in its ability to reject random and background noise. In the new systems, the signal to noise ratio at the output of the detector 32 increases as the square root of n. For example, if n is increased from 10 to 40, the S/N ratio is improved by a factor of two. However, the time required to make a decision is increased by a factor of four.

The threshold level at the output of the synchronous detector 36 directly affect both the false alarm probability and the correct-detection probability in a predictable manner. For a given S/N ratio, the detection probability can be increased, providing the correspondingly higher false alarm probability is acceptable.

Controls are advantageously included in the circuitry to allow selection of the recycle time, the number n of light flashes per burst and choice of external, manual or local, automatic triggering. Likewise, receiver gain and detector threshold values can be selected to optimize the system for any particular operation situation.

The embodiments of the invention in which an exclusive property or privilege is claimed are defined as follows:

1. Apparatus for submarine optical recording comprising:
   a camera to record scenes in a predetermined sector forward thereof,
   a source of light having a wavelength in the range between about 650 and 700 nm. provided with first optical means to project a divergent conical light beam from said source,
   means locating said first optical means spaced apart radially from said source to project said light beam so that it intersects said predetermined sector,
   receiver means to detect and measure the intensity of light in said wavelength range provided with second optical means to view a conical volume,
   means locating said second optical means spaced apart radially from said camera so said conical volume intersects said light beam and the intersecting peripheries of said light beam and said conical volume substantially define said predetermined sector, and
   signal means that is activated by said receiver means when it measures an intensity of light in said wavelength range above a predetermined minimum value.

2. The apparatus of claim 1 including a strobe unit positioned to project a beam of high intensity light into said predetermined sector when triggered by said signal means.

3. The apparatus of claim 1 wherein said receiver means includes a detector to receive light that passes through said second optical means.

4. The apparatus of claim 3 wherein said second optical means comprises a lens and a filter.

5. The apparatus of claim 1 wherein said source emits pulse modulated light and said receiver means is a synchronous receiver.

6. The apparatus of claim 1 wherein said source is a light emitting diode.

7. The apparatus of claim 6 wherein said diode is driven to emit square wave modulated light.

8. Apparatus for submarine optical recording comprising:
   a camera to record scenes in a predetermined sector forward thereof defined by a minimum distance $d_1$ and a maximum distance $d_2$ from and perpendicular to the focal plane of said camera,
   a source of light having a wavelength in the range between about 650 and 700 nm. provided with first optical means to project from said source a conical light beam having a divergence of $2\theta$, where $\theta$ is the maximum angle between the central axis and periphery of said beam,
   means locating said first optical means at a lateral distance D from said camera to project said light beam so that said central axis thereof intersects said predetermined sector,
   receiver means to detect and measure the intensity of light in said wavelength range provided with second optical means to view a conical volume having a divergency of between about $0.5\theta$ and $4\theta$,
   means locating said second optical means at a lateral distance from said camera between about 0.1D and 10D so that the central axis of said conical volume intersects said central axis of said light beam and the intersecting peripheries of said light beam and said conical volume substantially define said predetermined sector, and
   signal means that is activated by said receiver means when it measures an intensity of light in said wavelength range above a predetermined minimum value to cause said camera to record.

9. A method for submarine optical recording comprising:
   positioning a camera to record scenes in a predetermined sector forward thereof,
   projecting a divergent conical beam of light having a wavelength in the range between about 650 and 700 nm. from a source spaced apart radially of said camera so that said beam intersects said predetermined sector,
   detecting light of said wavelength existing in a divergent conical volume the apex of which is spaced apart radially from said camera so that said conical volume intersects said light beam and the intersecting peripheries of said light beam and said conical volume substantially define said predetermined sector,
   analyzing said detected light to determine when it reaches an intensity above a predetermined value, and
   causing said camera to record when said detected light reaches said intensity.

10. A method for submarine optical recording comprising:
    positioning a camera to record scenes in a predetermined sector forward thereof defined by a minimum distance $d_1$ and a maximum distance $d_2$ from and perpendicular to the focal plane of said camera, projecting a conical beam of light having a divergency of $2\theta$, where $\theta$ is the maximum angle between the central axis and periphery of said beam and a wavelength in the range between about 650 and 700 nm. from a source positioned a lateral distance D from said camera so that said central axis intersects said predetermined sector, detecting light of said wavelength existing in a conical volume having a divergency of between about $0.5\theta$ and $4\theta$, the apex of which is positioned at a lateral distance from said camera between 0.1D and 10D so that the central axis of said conical volume intersects said central axis of said light beam and the intersecting peripheries of said light beam and said conical volume substantially define said predetermined sector, analyzing said detected light to determine when it reaches an intensity above a predetermined value, and automatically causing said camera to record when said detected light intensity is at least great as said predetermined value.

11. The method of claim 10 which includes the step of projecting a beam of high intensity light into said predetermined sector when signalled to do so by said analyzing step.

12. The method of claim 10 wherein said source emits pulse modulated light and said light detection is performed using a synchronous receiver.

* * * * *